United States Patent
Mills et al.

(10) Patent No.: US 6,234,149 B1
(45) Date of Patent: May 22, 2001

(54) ENGINE CONTROL SYSTEM FOR MINIMIZING TURBOCHARGER LAG INCLUDING ALTITUDE AND INTAKE MANIFOLD AIR TEMPERATURE COMPENSATION

(75) Inventors: John R. Mills; Ward R. Edwards; John L. Hoehne, all of Columbus; David A. Bolis, Nashville; Gary C. Salemme, Columbus, all of IN (US); Lawrence H. Becker, Rugby (GB)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/257,855

(22) Filed: Feb. 25, 1999

(51) Int. Cl.$^7$ .................................................. F02M 59/20
(52) U.S. Cl. ............................................ 123/486; 701/104
(58) Field of Search ...................................... 701/104, 105; 123/486, 478, 480

(56) References Cited

U.S. PATENT DOCUMENTS

| | | |
|---|---|---|
| 4,223,534 | 9/1980 | Annus . |
| 4,269,156 * | 5/1981 | Drellishak ............................ 123/478 |
| 4,384,560 | 5/1983 | Jager et al. . |
| 4,466,247 | 8/1984 | Aoki . |
| 4,468,928 | 9/1984 | Suzuki . |
| 4,476,682 | 10/1984 | McInerney . |
| 4,664,081 | 5/1987 | Eheim et al. . |
| 4,685,435 | 8/1987 | Denz et al. . |
| 4,928,654 * | 5/1990 | Hosaka ................................. 123/654 |
| 4,959,789 * | 9/1990 | Nakamura ........................... 701/104 |
| 5,095,877 | 3/1992 | Kikuchi et al. . |
| 5,137,000 * | 8/1992 | Stepper et al. ....................... 123/478 |
| 5,218,941 | 6/1993 | Suzuki et al. . |
| 5,341,786 * | 8/1994 | Abe et al. ............................ 123/486 |
| 5,349,933 * | 9/1994 | Hasegawa et al. .................. 123/486 |
| 5,442,920 | 8/1995 | Kamel et al. . |
| 5,462,031 | 10/1995 | Kai . |
| 5,477,827 | 12/1995 | Eheim . |
| 5,848,582 | 12/1998 | Ehlers et al. . |

FOREIGN PATENT DOCUMENTS 0 740 061 A2    10/1996    (EP) .

* cited by examiner

Primary Examiner—Henry C. Yuen
Assistant Examiner—Arnold Castro
(74) Attorney, Agent, or Firm—Baker & Daniels

(57) ABSTRACT

An engine control system for optimizing a tradeoff between turbocharger lag and production of exhaust emissions including altitude and intake manifold air temperature compensation includes a turbocharger boost sensor, an engine speed sensor, an ambient pressure sensor and an intake manifold air temperature sensor, each providing appropriate sensor signals to a control computer. The control computer is operable to limit fueling signals supplied to the engine fuel system based on turbocharger boost, engine speed, ambient pressure and intake manifold air temperature to thereby optimize a tradeoff between turbocharger lag and production of black smoke and other exhaust emissions while compensating for changes in altitude and intake manifold air temperature. In one preferred embodiment, the control computer includes a fueling table stored therein which maps boost pressure and engine speed values to appropriate fueling values, an altitude correction table stored therein which maps boost pressure and ambient pressure to appropriate fueling correction values and an intake air temperature correction table store therein which maps intake manifold air temperature values to appropriate intake air temperature correction values. The control computer is operable to limit the fueling signals based on the fueling values from the fueling table, the fueling correction values from the altitude correction table and the fueling correction values from the intake air temperature correction table, to thereby maintain a desired tradeoff between turbocharger lag and production of black smoke and other exhaust emissions while compensating for changes in ambient pressure and intake manifold air temperature.

19 Claims, 6 Drawing Sheets

|   | BOOST PRESSURE | | | | |
| --- | --- | --- | --- | --- | --- |
|   | B1 | B2 | B3 | ... | BK |
| P1 | $FC_{11}$ | $FC_{12}$ | $FC_{13}$ | ... | $FC_{1K}$ |
| P2 | $FC_{21}$ | $FC_{22}$ | $FC_{23}$ | ... | $FC_{2K}$ |
| P3 | $FC_{31}$ | $FC_{32}$ | $FC_{33}$ | ... | $FC_{3K}$ |
| ⋮ | ⋮ | ⋮ | ⋮ | ⋮ | ⋮ |
| PJ | $FC_{J1}$ | $FC_{J2}$ | $FC_{J3}$ | ... | $FC_{JK}$ |

(AMBIENT PRESSURE on vertical axis) — 120

FIG. 7

| T1 | $FC_1$ |
| --- | --- |
| T2 | $FC_2$ |
| T3 | $FC_3$ |
| ⋮ | ⋮ |
| TL | $FC_L$ |

(INTAKE MANIFOLD TEMP on vertical axis) — 122

FIG. 8

ENGINE CONTROL SYSTEM FOR MINIMIZING TURBOCHARGER LAG INCLUDING ALTITUDE AND INTAKE MANIFOLD AIR TEMPERATURE COMPENSATION

FIELD OF THE INVENTION

The present invention relates generally to systems for controlling the operation of an internal combustion having a turbocharger to thereby optimize a tradeoff between turbocharger lag and production of exhaust emissions, and more specifically to such systems including altitude (ambient air pressure) and intake manifold air temperature compensation strategies.

BACKGROUND OF THE INVENTION

Internal combustion engines having turbocharger units attached thereto are commonplace in the automotive, heavy duty truck and industrial vehicle industries. Such turbocharger units are generally responsive to at least some of the engine exhaust gas to increase air pressure in an intake manifold of the engine to thereby provide for increased intake manifold air pressure (i.e., boost pressure) and correspondingly increased engine performance. One problem that exists with turbocharged engines, however, is "turbocharger lag" which is defined for the purposes of the present invention as a time delay between the initiation of a transient event (e.g., a rapid increase in accelerator pedal position) and the stabilization (i.e., steady state condition) of turbocharger boost pressure resulting from the transient event. During such turbocharger lag conditions, overfueling of the engine typically occurs which results in the unwanted production of black smoke and other exhaust emissions. However, if fueling is reduced during such transient events, turbocharger lag time increases. Accordingly, there exists a tradeoff between turbocharger lag and the production of black smoke and other unwanted exhaust emissions.

Heretofore, one technique that designers of electronic engine control systems have used to address the problem of black smoke production (as well as the production of other unwanted exhaust emissions) during turbocharger lag conditions is a so-called electronic air fuel control (AFC) strategy. Typical AFC strategies attempt optimize the tradeoff between turbocharger lag and production of exhaust emissions, whereby a balance is struck between the two conditions resulting in acceptable levels of each. An example of one known system 10 for providing such an AFC strategy is illustrated in FIG. 1. Referring to FIG. 1, system 10 includes a control computer 12 operable to interface with, and control the operation of, an internal combustion engine 14. System 10 includes an engine speed sensor associated with engine 14 and operable to provide an engine speed signal to control computer 14 via signal path 18. System 10 further includes a turbocharger 20 associated with engine 14 and coupled to an intake manifold 22 via conduit 24. An aftercooler 26 is typically positioned within the intake manifold 26 and a boost pressure sensor 28 (typically a gage or absolute pressure sensor) is disposed between the aftercooler 26 and engine 14. The boost pressure sensor 28 is operable to provide a boost pressure signal to control computer 12, corresponding to intake manifold air pressure, or "boost" pressure, provided by turbocharger 20, via signal path 30. A fueling system 32 is responsive to a fueling signal provided thereto by control computer 12 on signal path 34 to supply fuel to engine 14.

Control computer 12 includes a memory unit (not shown) having an AFC fueling strategy 36 stored therein. AFC fueling strategy 36 provides an AFC fueling signal, based on the engine speed signal provided thereto via signal path 18 and the boost pressure signal provided thereto via signal path 30, to fueling logic block 40 via signal path 36'. A number, P, of other engine fueling control strategies also provide fueling signals to fueling logic block 40 via a corresponding number of signal paths $38_1$–$38_P$. Examples of such other engine fueling control strategies may include one or more engine speed governors, a maximum vehicle speed limiter, and the like. In any case, fueling logic block 40 is typically operable in accordance with a "least wins" or MIN logic strategy, whereby the fueling signal provided to fueling system 32 on signal path 34 is the minimum fueling value provided to block 40 via the various signal paths 36 and $38_1$–$38_P$.

FIG. 2 illustrates one known form of the AFC block 36 of FIG. 1 wherein AFC block 36 is implemented as a look-up table 42 stored within a memory unit (not shown) of control computer 12. Table 42 includes a number, N, of columns corresponding to boost pressure values $B_1$–$B_N$ and a number, M, of rows corresponding to engine speed values $E_1$–$E_M$. Table 42 is operable to provide an appropriate fueling value $F_{xy}$ (typically in units of mm3/stroke) based on current values of turbocharger boost and engine speed. In accordance with one known embodiment of table 42, the fueling values $F_{xy}$ increase with increasing engine speed for each boost pressure column between $B_1$ and $B_K$ where 2<K<N, and remain constant within each boost pressure column between $B_k$ and $B_N$. In this manner, fueling is limited to provide a minimum air-to-fuel ratio (A/F) for optimizing a tradeoff between turbocharger lag and production of exhaust emissions such as black smoke and other unwanted emissions.

While the A/F control strategy illustrated in FIGS. 1 and 2 may effectively limit fueling to thereby optimize the tradeoff between turbocharger lag and production of unwanted exhaust emissions, it does not account for changes in absolute air pressure due to changes in altitude, nor does it account for changes in intake manifold air temperature. An equation relating air-to-fuel ratio (A/F) to intake manifold boost pressure and fueling is given by:

$$A/F = (\eta_v * displ * P_{man})/(\#cyl * T_{man} * fueling) \quad (1),$$

where $\eta_v$ is volumetric efficiency, displ is the piston displacement within each cylinder, $P_{man}$ is the absolute manifold air pressure, #cyl is the number of cylinders, $T_{man}$ is the intake manifold air temperature and fueling is a current engine fueling value. From equation (1) it can be seen that the actual A/F value is directly proportional to the absolute pressure within the intake manifold, and inversely proportional to the intake manifold air temperature.

Referring to FIG. 3, a plot 44 of A/F ratio vs. altitude at various boost pressure values for the prior art AFC control strategy of FIGS. 1 and 2 is shown illustrating that as ambient air pressure decreases due to a rise in altitude, A/F decreases regardless of boost pressure. Plot 44 also includes a stoichiometric A/F value 46 (i.e., minimum A/F ratio required for complete combustion; 14.7 in this example), and further illustrates that as ambient air pressure drops significantly at very high altitudes, A/F drops well below the stoichiometric value for each of the boost pressure values illustrated. This will result in both high smoke production and poor transient performance due to significant overfueling of the engine 14 during transient events.

One possible solution to the foregoing problem would be to use an absolute air pressure sensor in place of the commonly used gage boost pressure sensor 28 in FIG. 1 and modify table 42 of FIG. 2 to always maintain an A/F value above stoichiometric. This solution, however, would undesirably result in inconsistent transient response depending upon altitude, and turbocharger lag would accordingly be different at different altitudes due to the decrease in allowable fueling. What is therefore needed is a system for controlling A/F to thereby consistently optimize the tradeoff between turbocharger lag and production of unwanted exhaust emissions, yet compensate for changes in ambient pressure due to changes in altitude. Such a system should ideally also provide for the ability to compensate for changes in intake manifold air temperature to thereby provide maximum control over the A/F parameter, particularly during a transient event.

SUMMARY OF THE INVENTION

The foregoing shortcomings of the prior art are addressed by the present invention. In accordance with one aspect of the present invention, an engine control system for optimizing a tradeoff between turbocharger lag and production of exhaust emissions including altitude compensation comprises a turbocharger coupled to an internal combustion engine, a fuel system responsive to a fueling signal to supply fuel to the engine, means for determining a boost pressure indicative of air pressure supplied by the turbocharger to the engine and providing a boost pressure signal corresponding thereto, means for determining engine speed and providing an engine speed signal corresponding thereto, means for determining ambient air pressure and producing an ambient air pressure signal corresponding thereto, and a control computer responsive to the boost pressure signal, the engine speed signal and the ambient air pressure signal to limit the fueling signal to thereby compensate for changes in altitude while optimizing a tradeoff between turbocharger lag and production of exhaust emissions.

In accordance with another aspect of the present invention, a method of optimizing a tradeoff between turbocharger lag and production of exhaust emissions including altitude compensation in an internal combustion engine having a turbocharger coupled thereto comprises the steps of sensing engine speed and providing an engine speed signal corresponding thereto, sensing a boost pressure corresponding to air pressure supplied to the engine by the turbocharger and providing a boost pressure signal corresponding thereto, sensing an ambient air pressure and producing an ambient air pressure signal corresponding thereto, and limiting fuel supplied to the engine based on the engine speed, boost pressure and ambient air pressure signals to thereby compensate for changes in altitude while optimizing a tradeoff between turbocharger lag and production of exhaust emissions.

In accordance with yet another aspect of the present invention, an engine control system for optimizing a tradeoff between turbocharger lag and production of exhaust emissions including intake manifold air temperature compensation comprises a turbocharger coupled to an internal combustion engine, a fuel system responsive to a fueling signal to supply fuel to the engine, means for determining a boost pressure indicative of air pressure supplied by the turbocharger to the engine and providing a boost pressure signal corresponding thereto, means for determining engine speed and providing an engine speed signal corresponding thereto, means for determining a temperature of ambient air supplied by the turbocharger to an intake manifold of the engine and providing an intake air temperature signal corresponding thereto, and a control computer responsive to the boost pressure signal, the engine speed signal and the intake air temperature signal to limit the fueling signal to thereby compensate for changes in intake manifold air temperature while optimizing a tradeoff between turbocharger lag and production of exhaust emissions.

In accordance with a further aspect of the present invention, a method of optimizing a tradeoff between turbocharger lag and production of exhaust emissions including intake manifold air temperature compensation in an internal combustion engine having a turbocharger coupled thereto comprises the steps of sensing engine speed and providing an engine speed signal corresponding thereto, sensing a boost pressure corresponding to air pressure supplied to the engine by the turbocharger and providing a boost pressure signal corresponding thereto, sensing a temperature of air supplied by the turbocharger to an intake manifold of the engine and providing an intake air temperature signal corresponding thereto, and limiting fuel supplied to the engine based on the engine speed, boost pressure and intake air temperature signals to thereby compensate for changes in intake manifold air temperature while optimizing a tradeoff between turbocharger lag and production of exhaust emissions.

One object of the present invention is to provide an engine control system operable to optimize a tradeoff between turbocharger lag and production of exhaust emissions while compensating for changes in ambient pressure and intake manifold air temperature to thereby maintain consistent transient response regardless of changes in altitude (ambient air pressure) and intake manifold air temperature.

Another object of the present invention is to provide such a system for compensating for ambient pressure changes due to changes in altitude on an automatic fuel control strategy directed at optimizing a tradeoff between turbocharger lag and production of exhaust emissions.

Yet another object of the present invention is to provide such a system for compensating for changes in intake manifold air temperature on an automatic fuel control strategy directed at optimizing a tradeoff between turbocharger lag and production of exhaust emissions.

These and other objects of the present invention will become more apparent from the following description of the preferred embodiment.

BRIEF DESCRIPTION OF THE DRAWINGS

FIG. 7 is a table of fueling correction values for various boost and ambient pressure values corresponding to one preferred embodiment of the altitude correction block of FIG. 6.

FIG. 8 is a table of fueling correction values for various intake manifold temperature values corresponding to one preferred embodiment of the manifold temp correction block of FIG. 6.

DESCRIPTION OF THE PREFERRED EMBODIMENT

Figures 1, 2:
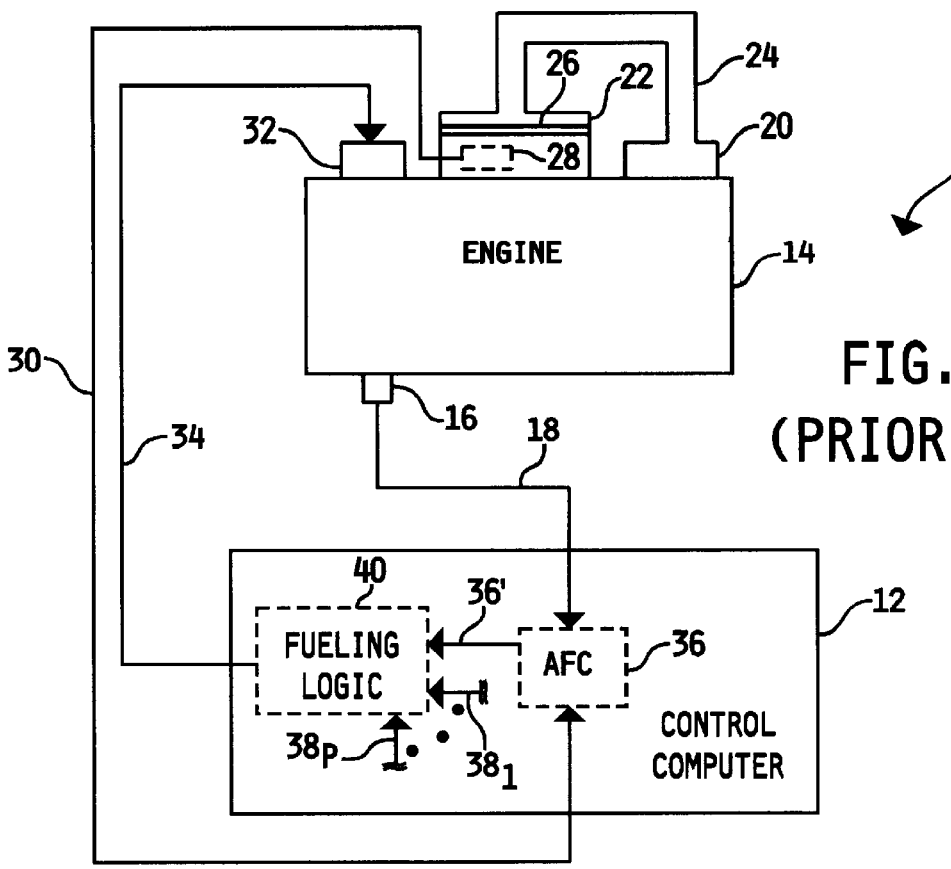
FIG. 1 is a block diagram illustration of a prior art engine control system optimizing a tradeoff between turbocharger lag and production of exhaust emissions by implementing an automatic fueling control strategy.
FIG. 2 is a table of fueling values for various boost pressure and engine speed values corresponding to one embodiment of the prior art automatic fueling control strategy block illustrated in FIG. 1.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 4:
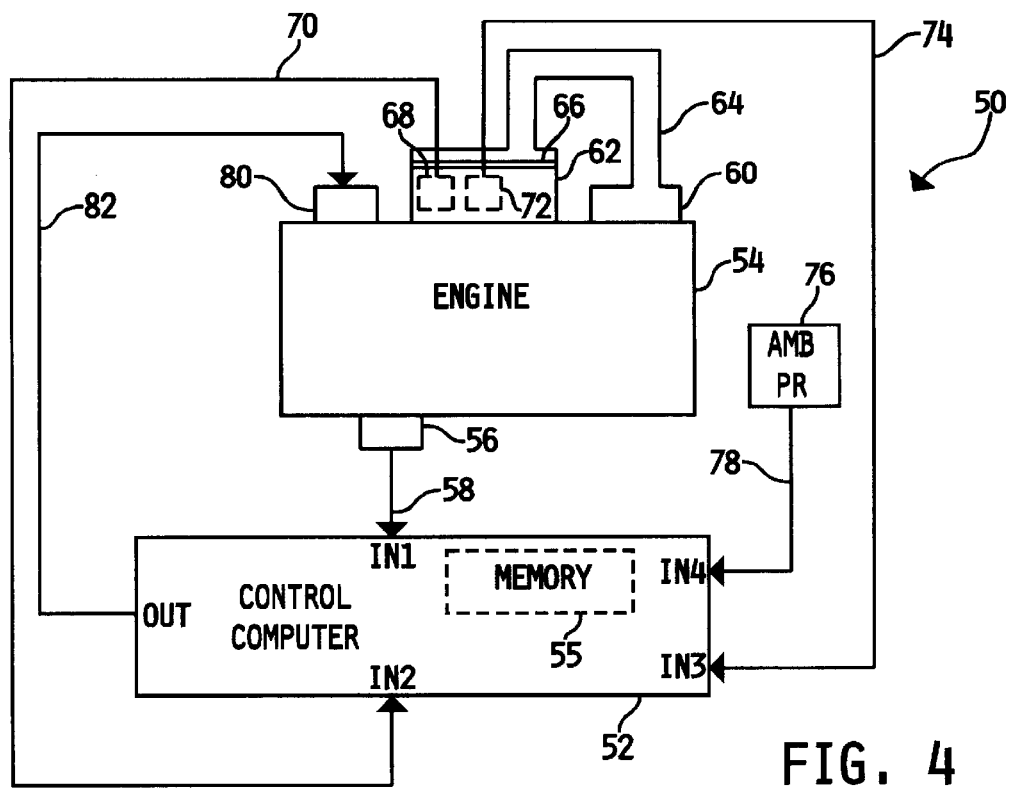
FIG. 4 is a block diagram illustration of one preferred embodiment of an engine control system for optimizing a tradeoff between turbocharger lag and production of exhaust emissions including altitude and intake manifold air temperature compensation, in accordance with one aspect of the present invention.

Referring now to FIG. 4, one preferred embodiment of an engine control system 50 for optimizing a tradeoff between turbocharger lag and production of exhaust emissions including altitude and intake manifold air temperature compensation, in accordance with the present invention, is shown. System 50 includes a control computer 52 operable to manage and control the overall operation of an internal combustion engine 54, wherein control computer 52 is preferably microprocessor-based and includes a memory portion 55. Memory portion 55 includes a number of software algorithms executable by control computer 52 for controlling various aspects of engine 54.

System 50 includes an engine speed sensor 56 operatively connected to engine 54 and electrically connected to an input IN1 of control computer 52 via signal path 58. Sensor 56 is preferably a Hall effect sensor operable to sense passage thereby of a number of teeth forming part of a gear or tone wheel, although the present invention contemplates that sensor 56 may alternatively be another known sensor operable to sense speed and/or position of a rotating member such as, for example, a variable reluctance sensor. In any case, engine speed sensor 56 is operable to sense engine speed (RPM) and provide control computer 52 with a corresponding engine speed signal at input IN1.

Engine 54 includes a turbocharger 60 of known construction, wherein turbocharger 60 is connected to an intake manifold 62 of engine 54 via conduit 64. When not in operation, turbocharger 60 is operable to allow the flow of air therethrough from ambient to the intake manifold 62 through conduit 64, and when in operation, turbocharger 60 is responsive to engine exhaust gas flow to provide increased air flow; i.e., "boost", to intake manifold 62 via conduit 64 as is known in the art. In either case, turbocharger 60 is operable to supply intake air to engine 54 via intake manifold 62. Intake manifold 62 preferably includes therein an aftercooler 66 of known construction, and a boost pressure sensor 68 disposed between aftercooler 66 and engine 54. It is to be understood, however, that intake manifold 62 may alternatively include an air-to-air cooler in place of aftercooler 66, or may omit any such cooling structure altogether.

Boost pressure sensor 68 is preferably a so-called "gage" pressure sensor in that it is operable to provide a signal indicative only of boost pressure supplied thereto via turbocharger 60. In other words, when turbocharger 60 supplies no boost, sensor 68 preferably senses zero pressure, and as boost pressure increases, so does the pressure reading of sensor 68. Sensor 68 is of known construction and is electrically connected to an input IN2 of control computer 52 via signal path 70. Sensor 68 is operable to sense boost pressure; i.e., pressure of boost air supplied to intake manifold 62 via turbocharger 60, and provide a corresponding boost pressure signal to control computer 52 at input IN2. In an alternative embodiment of the present invention, boost pressure sensor 68 may be an absolute air pressure sensor of known construction.

Intake manifold 62 also preferably includes a temperature sensor 72 disposed between aftercooler 66 and engine 54. Sensor 72 is of known construction and is electrically connected to an input IN3 of control computer 52 via signal path 74. Temperature sensor 72 is operable to sense the temperature of air flowing into intake manifold 62 and past aftercooler 66, and provide a corresponding intake air temperature signal to control computer 52 at input IN3.

System 50 further includes an ambient air pressure sensor 76 of known construction and electrically connected to an input IN4 of control computer 52 via signal path 78. Ambient air pressure sensor 76 is operable to sense the pressure of ambient air about engine 54 and provide a corresponding ambient air pressure signal at input IN4.

Engine 54 includes a fuel system 80 of known construction, wherein fuel system 80 is electrically connected to an output OUT of control computer 52 via signal path 82. Control computer 52 is operable, as is known in the art, to provide fueling signals to fuel system 80 via signal path 82, whereby fuel system 80 is responsive to the fueling signals to supply fuel to engine 54 in a known manner.

Figure 5:
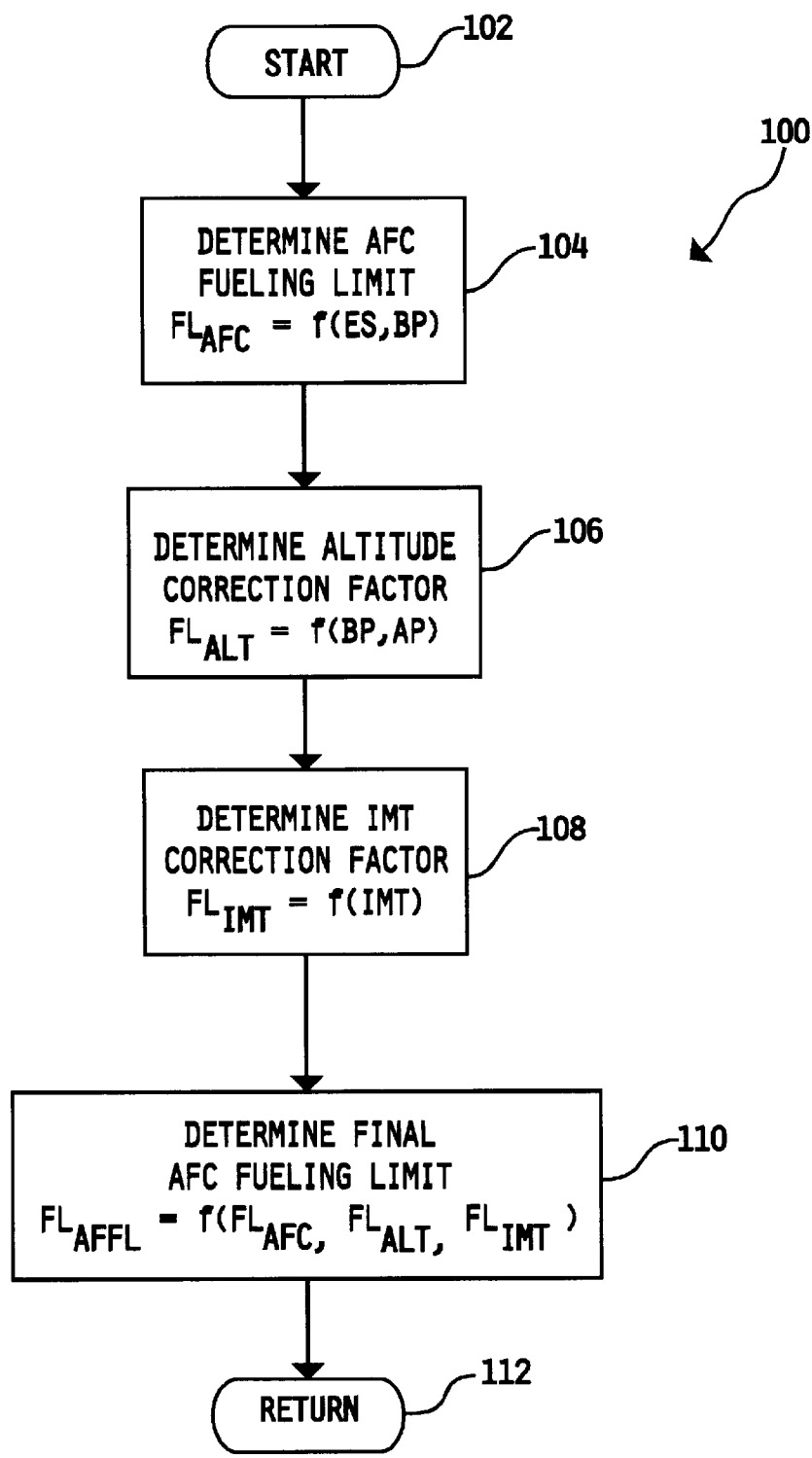
FIG. 5 is a flowchart illustrating one preferred embodiment of a software algorithm, implemented by the control computer of the system of FIG. 4, for optimizing a tradeoff between turbocharger lag and production of exhaust emissions including altitude and intake manifold air temperature compensation, in accordance with another aspect of the present invention.

Referring now to FIG. 5, a flowchart is shown illustrating one preferred embodiment of a software algorithm 100, executable by the control computer 52 of system 50, for controlling engine 54 so as to optimize a tradeoff between turbocharger lag and production of exhaust emissions while compensating for changes in altitude and intake manifold air temperature, in accordance with the present invention. Algorithm 100 is preferably stored within memory portion 55 of control computer 52 and is executed by computer 52 many times per second as is known in the art.

The air-to-fuel ratio (A/F) supplied to engine 54 via system 50 is governed by equation (1) set forth hereinabove in the BACKGROUND section. As previously discussed, A/F is dependent upon many factors including absolute manifold air pressure and intake manifold air temperature. In accordance one preferred embodiment of the present invention, algorithm 100 is operable to determine a fueling limit that is a function of engine speed, boost pressure, ambient air pressure and intake manifold air temperature, whereby control computer 52 is operable to limit the fueling signals supplied to fuel system 80 under transient operating conditions to thereby optimize a tradeoff between turbocharger lag and production of exhaust emissions while compensating for changes in altitude and intake manifold air temperature. In one embodiment of the present invention, the tradeoff between turbocharger lag and production of unwanted exhaust emissions is optimized by controlling A/F, via control computer 52, to provide for consistent transient response regardless of altitude and intake manifold air temperature while also maintaining A/F above the stoichiometric level to thereby insure complete combustion and minimize emissions. Other optimization strategies relating to the tradeoff between turbocharger lag and production of unwanted exhaust emissions will occur to those skilled in the art, and such other strategies are intended to fall within the scope of the present invention.

Figure 3:
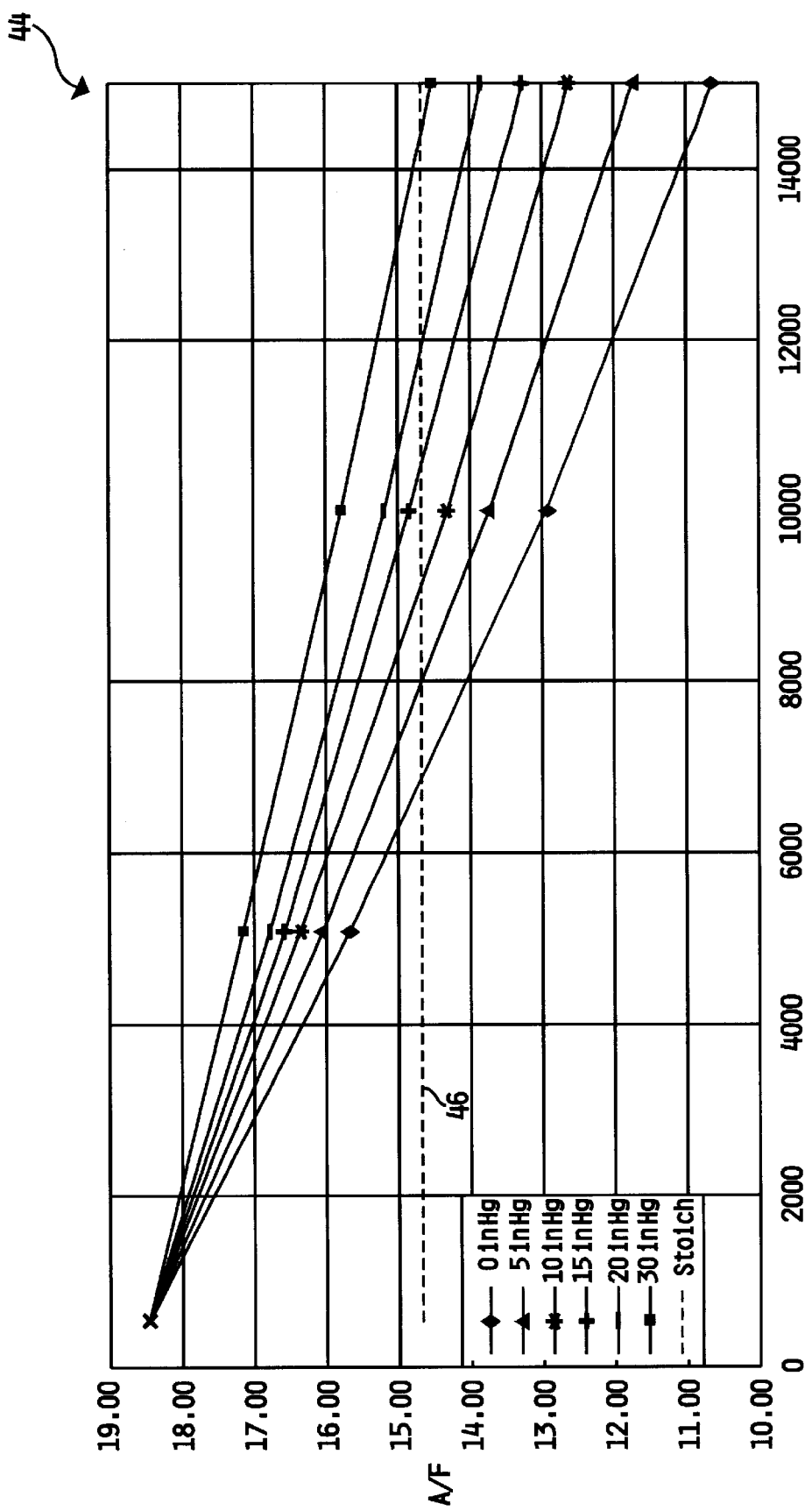
FIG. 3 is a plot of air-to-fuel ratio vs. altitude illustrating the effect of ambient pressure changes on the automatic fueling control strategy of FIGS. 1 and 2.

Algorithm 100 begins at step 102, and at step 104, control computer 52 is operable to determine an automatic fueling control (AFC) fueling limit $FL_{AFC}$ as a function of engine speed ES, preferably provided by engine speed sensor 56, and boost pressure BP, preferably provided by boost pressure sensor 68. Step 104 is identical to the AFC strategy described with respect to FIGS. 1–3 in the BACKGROUND section, and is designed to optimize a tradeoff between turbocharger lag and production of exhaust emissions at a given altitude or altitude range and at a given intake manifold air temperature or intake manifold air temperature range as is known in the art. Step 104 advances to step 106 where control computer 52 is operable to determine an altitude correction factor $FL_{ALT}$ as a function of boost pressure BP, preferably provided by boost pressure sensor 68, and ambient air pressure AP, preferably provided by ambient air pressure sensor 76. In one embodiment, $FL_{ALT}$ is preferably a two-dimensional function that decreases as altitude increases (i.e., as ambient pressure decreases) and that also decreases as boost pressure decreases, although the present invention contemplates that $FL_{ALT}$ may alternatively be designed to be any desired function of BP and AP.

Step 106 advances to step 108 where control computer 52 is operable to determine an intake manifold air temperature correction factor $FL_{IMT}$ as a function of intake manifold air temperature IMT, preferably provided by intake manifold air temperature sensor 72. In one embodiment, $FL_{IMT}$ preferably decreases as intake manifold air temperature increases, although the present invention contemplates that $FL_{IMT}$ may alternatively be designed to be any desired function of IMT. In any case, step 108 advances to step 110 where control computer 52 is operable to determine a final fueling limit $FL_{AFFL}$ as a function of $FL_{AFC}$, $FL_{ALT}$ and $FL_{IMT}$. In one embodiment, $FL_{AFC}$ is a fuel command function (e.g. in units of $mm^3$/stroke), and $FL_{ALT}$ and $FL_{IMT}$ are dimensionless correction factors having values less than or equal to one. In this embodiment, $FL_{AFFL} = FL_{AFC} * FL_{ALT} * FL_{IMT}$, whereby the AFC fueling limit $FL_{AFC}$ is further limited or decreased by $FL_{ALT}$ and/or $FL_{IMT}$ as altitude and/or intake manifold air temperature conditions correspondingly warrant. It is to be understood, however, that the final AFC fueling limit $FL_{AFFL}$ may alternatively be determined in accordance with other more or less complicated functions of $FL_{ALT}$ and $FL_{IMT}$ and that such alternate determinations of $FL_{AFFL}$ are intended to fall within the scope of the present invention. In any event, algorithm 100 advances from step 110 to step 112 where algorithm 100 is returned to its calling routine. Alternatively, step 112 may be omitted and step 110 may loop back to step 104 for continuous execution of algorithm 100.

Figure 6:
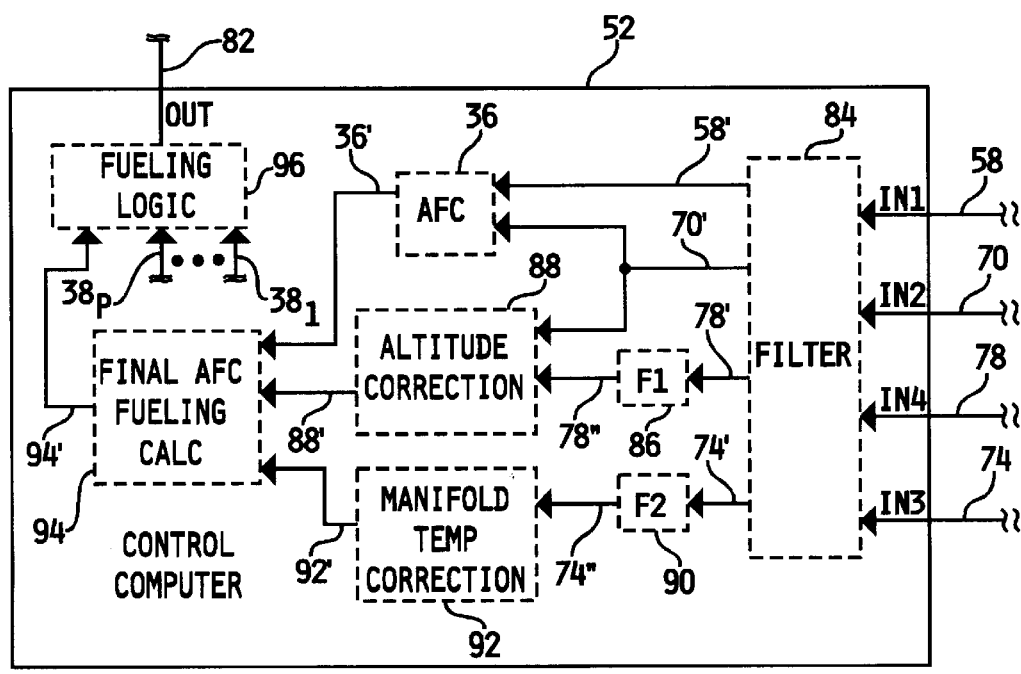
FIG. 6 is a diagrammatic illustration of one preferred embodiment of the internal process blocks of the control computer of the system of FIG. 4 as they relate to a strategy for optimizing a tradeoff between turbocharger lag and production of exhaust emissions including altitude and intake manifold air temperature compensation, in accordance with yet another aspect of the present invention.

Referring now to FIG. 6, some of the internal features of control computer 52 for carrying out one preferred embodiment of algorithm 100, in accordance with the present invention, are shown. It is to be understood that the internal features of control computer 52 illustrated in FIG. 6 are intended to represent software blocks or features rather than physical structure, and that they accordingly represent one preferred software implementation of algorithm 100. In any case, inputs IN1–IN4 are each provided to a filter block 84 wherein high frequency noise and other undesirable components of the engine speed, boost pressure, ambient air pressure and intake manifold air temperature signals are removed in a known manner. A filtered engine speed signal is provided to a first input of an automatic fuel control (AFC) block 36 by filter block 84 via signal path 58'. A filtered boost pressure signal is similarly provided to a second input of AFC block 36 and to a first input of an altitude correction block 88 by filter block 84 via signal 70'.

A filtered ambient air pressure signal is provided to another filter block F1 86 by filter block 84 via signal path 78'. An output of filter block F1 86 is provided to a second input of altitude correction block 88 via signal path 78". It is to be understood that filter block F1 86 is optional and may be included to provide additional filtering of the ambient air pressure signal, or may be alternatively omitted in which case signal path 78' leads directly to the second input of altitude correction block 88. A filtered intake air temperature signal is provided to yet another filter block F2 90 by filter block 84 via signal path 74'. An output of filter block F2 90 is provided to an input of manifold temp correction block 92 via signal path 74". It is to be understood that, like filter block F1 86, filter block F2 90 is optional and may be included to provide additional filtering of the intake air temperature signal, or may be alternatively omitted in which case signal path 74' leads directly to the input of manifold temp correction block 92. Filter blocks F1 86 and F2 90 may be included to provide for special purpose filtering of the ambient air pressure and intake air temperature signals, an example of which might be to minimize the effect of altitude and intake manifold air temperature compensation of the AFC strategy during conditions wherein a vehicle carrying system 50 may continuously undergo significant changes in altitude and/or intake manifold air temperature in a relatively short time duration (e.g. into and out of a deep mine shaft), and wherein it may be desirable to minimize any performance changes due to the AFC compensation strategies of the present invention. Such filtering is, however, not required by the present invention and filtering blocks 86 and 90 may accordingly be omitted.

An output of AFC block 36 is provided to a first input of a final AFC fueling calculation block 94 via signal path 36'. An output of altitude correction block 88 is provided to a second input of block 94, and an output of manifold temp correction block 92 is provided to a third input of block 94 via signal path 92'. A single output of final AFC fueling calculation block 94 is provided to a first input of a fueling logic block 96 via signal path 94'. Fueling logic block may have any number, N, of additional fueling signal inputs thereto provided via signal paths $38_1$–$38_N$. An output of fueling logic block 96 defines signal path 82 and is accordingly connected to fuel system 80 as described hereinabove.

In the implementation of algorithm 100 as represented in software block form in FIG. 6, AFC block 36, altitude correction block 88 and manifold temp correction block 92 are preferably implemented as tables. AFC block 36 may accordingly be implemented via a table of fueling values $F_{x,y}$, $1<x<M$, $1<y<N$ as shown and described with respect to FIG. 3. Altitude correction block 88 is, in this embodiment, implemented as a three-dimensional table 120 of fueling correction values $FC_{x,y}$, $1<x<J$, $1<y<K$ (J or K may be each be any integer) each as functions of corresponding ambient pressure values $P_w$, $1<w<J$, and corresponding boost pressure values $B_z$, $1<z<K$ as shown in FIG. 7. Preferably, $FC_{x,y} \leq 1$, and the values of $FC_{x,y}$ decrease as ambient pressure decreases (due to altitude increase) and as boost pressure decreases. Manifold temp correction block 92 is, in this embodiment, implemented as a two-dimensional table 122 of fueling correction values $FC_z$, $1<z<L$ as functions of corresponding intake manifold temperature values $T_z$, $1<z<L$, as shown in FIG. 8.

Fueling values $F_{x,y}$, as well as fueling correction values $FC_{x,y}$ and $FC_z$, are provided to final AFC fueling calculation block 94 via signal paths 36', 88' and 92' respectively, wherein block 94 is preferably operable to calculate a final fueling limit value $FL_{AFFL}$ in accordance with the equation $FL_{AFFL}=F_{x,y}*FC_{x,y}*FC_z$. However, the present invention contemplates that the final fueling limit value $FL_{AFFL}$ may alternatively be determined according to other desired functions of fueling values $F_{x,y}$ and fueling correction values $FC_{x,y}$ and $FC_z$. In any case, the final fueling limit value $FL_{AFFL}$ is provided to fueling logic block 96 via signal path 94', wherein fueling logic block 96 is operable to choose an appropriate fueling signal from signal paths 94' and $38_1$–$38_p$. according to predetermined logic rules. In one embodiment, fueling logic block is configured as a MIN block or "least wins" block whereby the minimum fueling value amongst those provided on signal paths 94' and $38_1$–$38_p$. is provided to fuel system 80 on signal path 82. However, the present invention contemplates that fueling logic block 96 may alternatively be configured in accordance with any desired logic rules.

Figure 9:
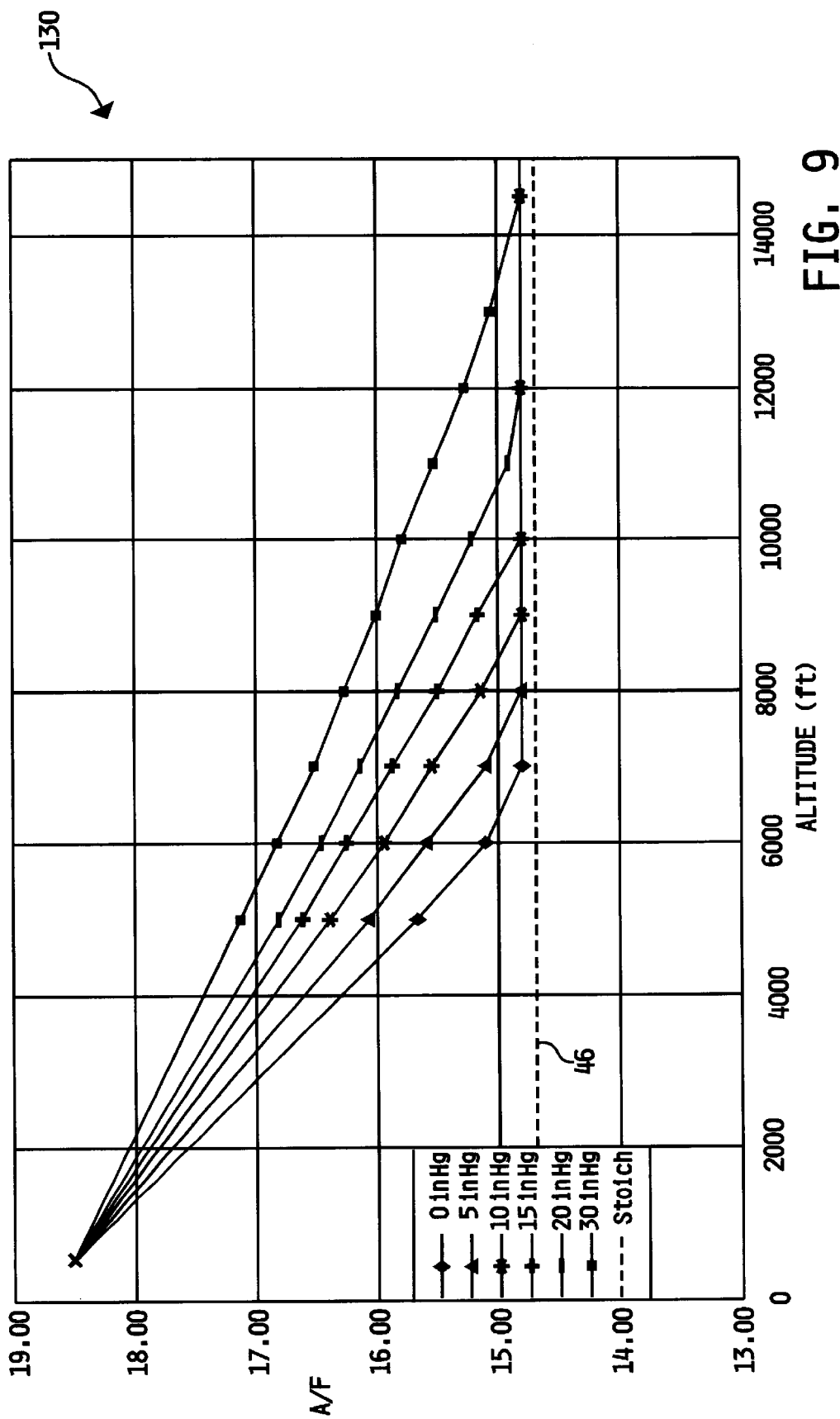
FIG. 9 is a plot of air-to-fuel ratio vs. altitude illustrating an example of one specific fueling control strategy implemented by the control computer shown in FIG. 4 in accordance with the control strategy illustrated in FIGS. 6–8.

The embodiment of the present invention described with respect to FIG. 6 results in an A/F plot 130 illustrated in FIG. 9. Plot 130 is similar to plot 44 of FIG. 2 except that A/F for any given boost value is maintained above the stoichiometric level at any altitude. Altitude correction block 88, preferably implemented as table 120 of FIG. 7, is operable to allow A/F to decrease as altitude increases, down to a lower limit that is above the stoichiometric level, for any boost pressure value to thereby provide for consistent transient response at any altitude. However, it should be noted from equation (1) above that A/F ratio is also inversely proportional to the intake manifold air temperature, and that the lower A/F limit established by altitude correction block 36 is subject to change with changing intake manifold air temperature. The manifold temp correction block 92, preferably implemented as table 122 of FIG. 8, is accordingly operable to control the lower limit of A/F (i.e., keep A/F from drifting downward) as the intake manifold temperature increases to thereby maintain the lower A/F limit at a constant value. In accordance with one embodiment of the altitude/intake manifold temperature compensation strategy of the present invention, consistent transient response is thus maintained regardless of altitude (ambient pressure) and intake manifold air temperature while also maintaining A/F above the stoichiometric level, thereby minimizing emissions and maximizing engine performance.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected. For example, while one embodiment of the present invention has been shown and described with respect to FIGS. 6–8 as being implemented via an AFC fueling block 36, altitude correction block 88, manifold temp correction block 92 and final AFC fueling calculation block 94, those skilled in the art will recognize that blocks 36, 88, 92 and 94 may alternatively be replaced with a single AFC block having altitude and intake manifold temperature correction designed therein. One specific embodiment of such an alternate design may include a number of AFC tables for each of a number of discrete ambient pressure values (altitudes) and intake manifold temperatures. As another example, those skilled in the art will recognize that the tables of FIGS. 2, 7 and 8 may alternatively be replaced with equations (discrete, continuous or piecewise continuous), graphs or other functions operable to map engine speed, boost pressure, ambient pressure and intake manifold air temperature to appropriate fuel limit values. As yet another example, those skilled in the art will recognize certain applications of the present invention wherein it may be desirable to provide only for altitude compensation of AFC and manifold temp correction block 92 of FIG. 6 may accordingly be omitted. Likewise, those skilled in the art will recognize certain applications of the present invention wherein it may be desirable to provide only for intake manifold temperature compensation of AFC and altitude correction block 88 of FIG. 6 may accordingly be omitted.

What is claimed is:

1. An engine control system for optimizing a tradeoff between turbocharger lag and production of exhaust emissions including altitude compensation, comprising:
   a turbocharger coupled to an internal combustion engine;
   a fuel system responsive to a fueling signal to supply fuel to said engine;
   means for determining a boost pressure indicative of air pressure supplied by said turbocharger to said engine and providing a boost pressure signal corresponding thereto;
   means for determining engine speed and providing an engine speed signal corresponding thereto;
   means for determining ambient air pressure and producing an ambient air pressure signal corresponding thereto; and
   a control computer responsive to said boost pressure signal and said engine speed signal to produce a first fueling limit, and to said boost pressure signal and said ambient air pressure signal to produce a second fueling limit, said control computer limiting said fueling signal as a function of said first and second fueling limits to thereby compensate for changes in altitude while optimizing a tradeoff between turbocharger lag and production of exhaust emissions.

2. The engine control system of claim 1 wherein said control computer is responsive to said boost pressure signal and said engine speed signal to limit said fueling signal under transient operating conditions to thereby optimize a tradeoff between turbocharger lag and production of exhaust emissions, said control computer responsive to said ambient air pressure signal and said boost pressure signal to further limit said fueling signal under said transient operating conditions to thereby compensate for changes in altitude.

3. The engine control system of claim 2 wherein said control computer is responsive to said ambient air pressure signal and said boost pressure signal to further limit said fueling signal under said transient operating conditions by decreasing fuel supplied to said engine as altitude increases and as boost pressure decreases.

4. The engine control system of claim 1 wherein said control computer includes:

a first table stored therein mapping engine speed and boost pressure values to a first set of fueling limits; and a second table stored therein mapping boost pressure and ambient pressure values to a second set of fueling limits;

and wherein said control computer is responsive to said engine speed and boost pressure signals to choose said first fueling limit from said first set of fueling limits, said control computer responsive to said boost pressure and ambient pressure signals to choose said second fueling limit from said second set of fueling limits, said control computer limiting said fueling signal as a product of said first and second fueling limits.

5. The engine control system of claim 1 further including:

means for determining a temperature of intake air supplied to an intake manifold of said engine by said turbocharger and providing an intake air temperature signal corresponding thereto;

and wherein said control computer is responsive to said intake air temperature signal to even further limit said fueling signal to thereby compensate for changes in intake manifold air temperature while optimizing a tradeoff between turbocharger lag and production of exhaust emissions.

6. The engine control system of claim 5 wherein said control computer is responsive to said boost pressure signal and said engine speed signal to limit said fueling signal under transient operating conditions to thereby optimize a tradeoff between turbocharger lag and production of exhaust emissions, said control computer responsive to said ambient air pressure signal and said boost pressure signal to further limit said fueling signal under said transient operating conditions to thereby compensate for changes in altitude, said control computer responsive to said intake air temperature signal to even further limit said fueling signal under said transient operating conditions to thereby compensate for changes in intake manifold air temperature.

7. The engine control system of claim 6 wherein said control computer is responsive to said intake air temperature signal to even further limit said fueling signal under said transient operating conditions by decreasing fuel supplied to said engine as intake manifold air temperature increases.

8. The engine control system of claim 5 wherein said control computer includes:

a first table stored therein mapping engine speed and boost pressure values to a first set of fueling limits;

a second table stored therein mapping boost pressure and ambient pressure values to a second set of fueling limits; and a third table store therein mapping intake manifold air temperature values to a third set of fueling limits;

and wherein said control computer is responsive to said engine speed and boost pressure signals to choose said first fueling limit from said first set of fueling limits, said control computer responsive to said boost pressure and ambient pressure signals to choose said second fueling limit from said second set of fueling limits, said control computer responsive to said intake air temperature signal to choose a third fueling limit from said third set of fueling limits, said control computer limiting said fueling signal as a product of said first, second and third fueling limits.

9. A method of optimizing a tradeoff between turbocharger lag and production of exhaust emissions including altitude compensation in an internal combustion engine having a turbocharger coupled thereto, the method comprising the steps of:

sensing engine speed and providing an engine speed signal corresponding thereto;

sensing a boost pressure corresponding to air pressure supplied to the engine by the turbocharger and providing a boost pressure signal corresponding thereto;

sensing an ambient air pressure and producing an ambient air pressure signal corresponding thereto;

determining a first fueling limit as a function of said engine speed and said boost pressure signals;

determining a second fueling limit as a function of said boost pressure signal and said ambient air pressure signal; and limiting fuel supplied to the engine as a function of the first and second fueling limits to thereby compensate for changes in altitude while optimizing a tradeoff between turbocharger lag and production of exhaust emissions.

10. The method of claim 9 wherein said second fueling limit is inversely proportional to increasing altitude and inversely proportional to decreasing boost pressure.

11. The method of claim 9 further including the steps of:

sensing a temperature of air supplied by the turbocharger to an intake manifold of the engine and providing an intake air temperature signal corresponding thereto; and determining a third fueling limit as a function of said intake air temperature signal;

and wherein said limiting step includes limiting fuel supplied to the engine further as a function of said third fueling limit to thereby compensate for changes in altitude and intake manifold air temperature while optimizing a tradeoff between turbocharger lag and production of exhaust emissions.

12. The method of claim 11 wherein said second fueling limit is inversely proportional to increasing altitude and inversely proportional to decreasing boost pressure.

13. The method of claim 12 wherein said third fueling limit is inversely proportional to increasing intake manifold air temperature.

14. An engine control system for optimizing a tradeoff between turbocharger lag and production of exhaust emissions including intake manifold air temperature compensation, comprising:

a turbocharger coupled to an internal combustion engine;

a fuel system responsive to a fueling signal to supply fuel to said engine;

means for determining a boost pressure indicative of air pressure supplied by said turbocharger to said engine and providing a boost pressure signal corresponding thereto;

means for determining engine speed and providing an engine speed signal corresponding thereto;

means for determining a temperature of ambient air supplied by said turbocharger to an intake manifold of said engine and providing an intake air temperature signal corresponding thereto; and a control computer responsive to said boost pressure signal and said engine speed signal to produce a first fueling limit and to said intake air temperature signal to produce a second fuel limit, said control computer limiting said fueling signal as a function of said first and second fueling limits to thereby compensate for changes in intake manifold air temperature while optimizing a tradeoff between turbocharger lag and production of exhaust emissions.

15. The engine control system of claim 14 wherein said control computer is responsive to said boost pressure signal and said engine speed signal to limit said fueling signal under transient operating conditions to thereby optimize a tradeoff between turbocharger lag and production of exhaust emissions, said control computer responsive to said intake air temperature signal to further limit said fueling signal under said transient operating conditions to thereby compensate for changes in intake manifold air temperature.

16. The engine control system of claim 15 wherein said control computer is responsive to said intake air temperature signal to further limit said fueling signal under said transient operating conditions by decreasing fuel supplied to said engine as intake manifold air temperature increases.

17. The engine control system of claim 14 wherein said control computer includes:
- a first table stored therein mapping engine speed and boost pressure values to a first set of fueling limits; and
- a second table stored therein mapping intake air temperature values to a second set of fueling limits;

and wherein said control computer is responsive to said engine speed and boost pressure signals to choose said first fueling limit from said first set of fueling limits, said control computer responsive to said intake air temperature signal to choose said second fueling limit from said second set of fueling limits, said control computer limiting said fueling signal as a product of said first and second fueling limits.

18. A method of optimizing a tradeoff between turbocharger lag and production of exhaust emissions including intake manifold air temperature compensation in an internal combustion engine having a turbocharger coupled thereto, the method comprising the steps of:
- sensing engine speed and providing an engine speed signal corresponding thereto;
- sensing a boost pressure corresponding to air pressure supplied to the engine by the turbocharger and providing a boost pressure signal corresponding thereto;
- sensing a temperature of air supplied by the turbocharger to an intake manifold of the engine and providing an intake air temperature signal corresponding thereto;
- determining a first fueling limit as a function of said engine speed and said boost pressure signals;
- determining a second fueling limit as a function of said intake air temperature signal; and
- limiting fuel supplied to the engine as a function of said first and second fueling limits to thereby compensate for changes in intake manifold air temperature while optimizing a tradeoff between turbocharger lag and production of exhaust emissions.

19. The method of claim 18 wherein said second fueling limit is inversely proportional to increasing intake manifold air temperature.

* * * * *